March 10, 1942.                    B. DICK                        2,276,027
                          PISTON AND PACKING CUP
                           Filed May 20, 1939              2 Sheets-Sheet 1

INVENTOR
BURNS DICK

ATTORNEY

March 10, 1942.  B. DICK  2,276,027

PISTON AND PACKING CUP

Filed May 20, 1939   2 Sheets—Sheet 2

INVENTOR
BURNS DICK
BY
ATTORNEY

Patented Mar. 10, 1942

2,276,027

UNITED STATES PATENT OFFICE 2,276,027

PISTON AND PACKING CUP

Burns Dick, Ferguson, Mo., assignor to Wagner Electric Corporation, St. Louis, Mo., a corporation of Delaware Application May 20, 1939, Serial No. 274,690

14 Claims. (Cl. 309—33)

My invention relates to improvements in piston and packing cup constructions for fluid pressure apparatus and more particularly to means for preventing the efficiency of the packing cup from being impaired.

One of the objects of my invention is to provide means for association with a piston which will prevent any portion of a flexible packing cup from becoming positioned in the clearance between the piston and its cylinder wall whereby a subsequent movement of the piston may cause the cup to be "cut," "chewed" or otherwise damaged.

Another object of my invention is to provide means for association with the head of a piston which will present such a surface for engagement with the base of a packing cup that no opening will be present into which a portion of the cup can be forced by fluid under pressure acting on the cup, thus resulting in damage to the cup.

Figure 1:
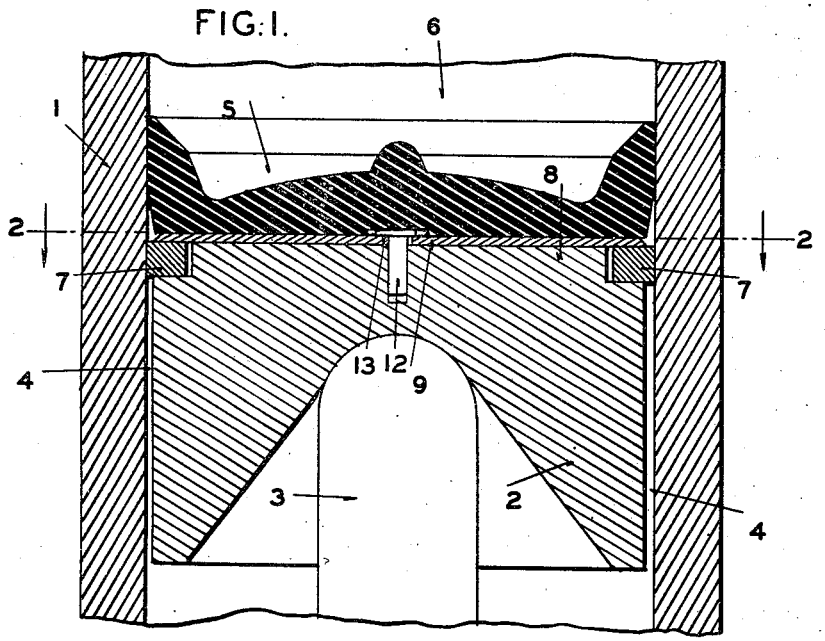
Figure 2:
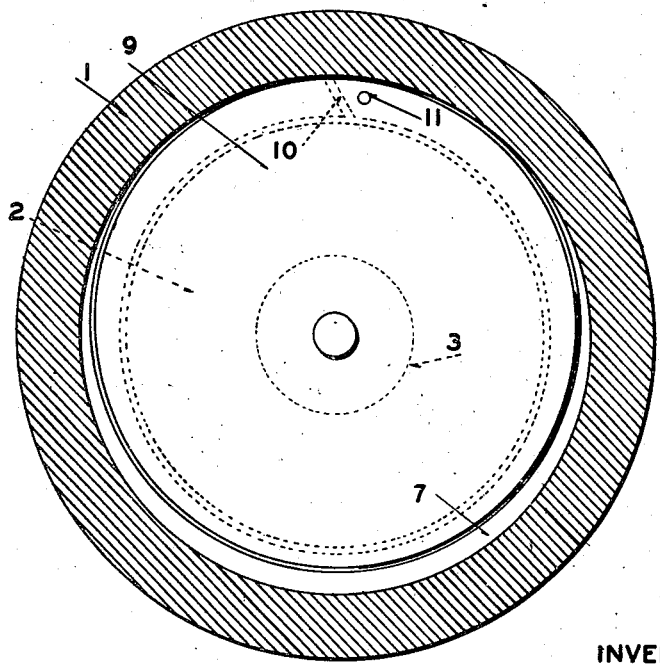
Figure 3:
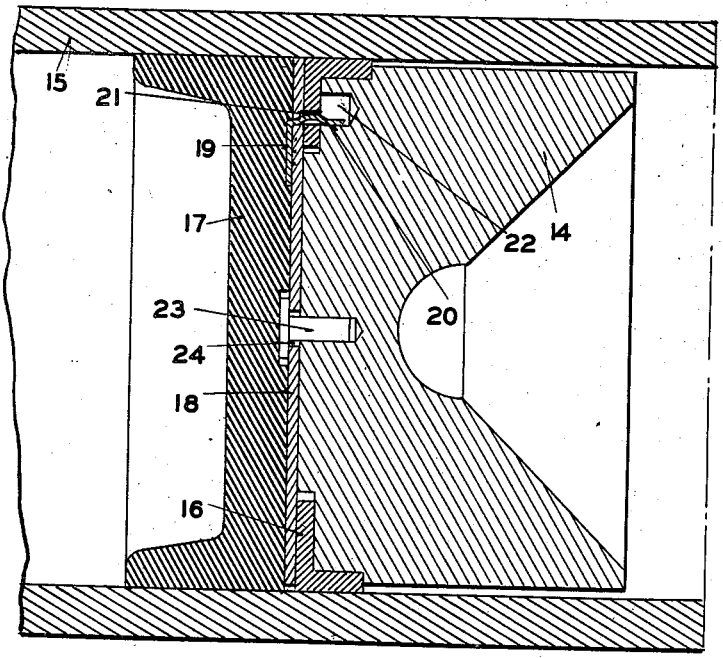
Figure 4:
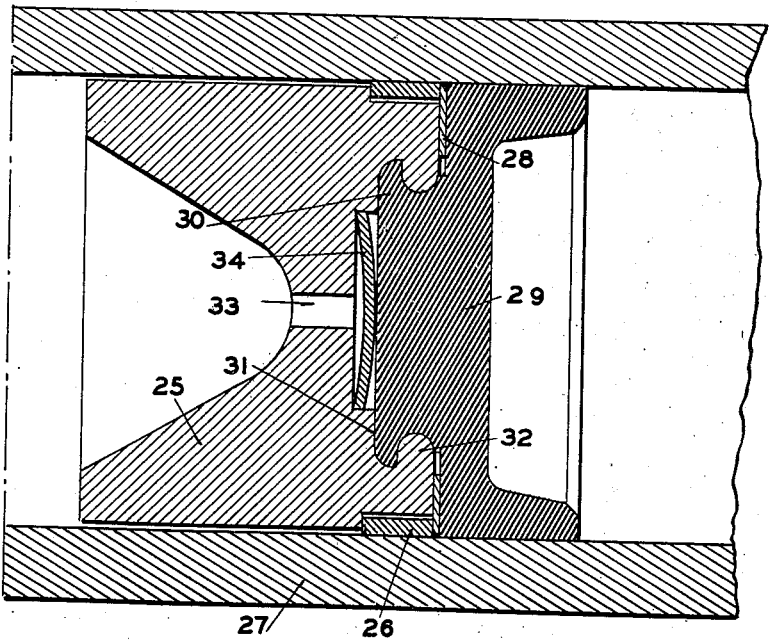

Other objects of my invention will become apparent from the following description taken in connection with the accompanying drawings in which Figure 1 is a cross-sectional view through a piston and packing cup construction showing my invention embodied therein; Figure 2 is an end view of the piston taken on the line 2—2 of Figure 1; Figure 3 is a cross-sectional view through a slightly modified construction; and Figure 4 is a cross-sectional view of another modification showing my invention embodied in a small diameter piston.

In fluid pressure systems such as hydraulic brake systems which employ a piston and cylinder combination there is associated with the head of the piston a yieldable packing cup which is usually made of rubber or a rubber compound. In order that the piston may properly move within the cylinder, there is provided a clearance between the piston and cylinder wall which increases as the piston and the cylinder wall wear. When this construction is subjected to fluid pressure, the material of the cup will flow and extrusion will occur, thereby causing the material to enter the clearance space between the piston and the cylinder wall. The amount of extrusion will depend upon the grade of material and the fluid pressure effective thereon. When the pressure of the fluid is relieved to permit the return movement of the piston, it often happens that this extruded portion of the cup may be "chewed" or sheared off. Also, if the resiliency of the material has decreased, particles of the material may drop off the extruded part of the cup. Since the piston and cylinder combination is often subject to considerable heat, softening of the rubber will also take place, thus permitting the cup to be more easily extruded into the clearance space between the piston and the cylinder wall. The "cutting" or "chewing" of the cup may happen frequently, thus sometimes causing a complete failure of the sealing action of the cup by cutting said cup completely through its wall. In accordance with my invention, I have provided means which will prevent any portion of the cup from being extruded or forced into the clearance between the piston and the cylinder wall, thus eliminating the possibility of the cup being damaged in a manner set forth.

Referring to the figures in detail, numeral 1 indicates the cylinder of a fluid motor within which is reciprocable a piston 2 for operating a piston rod 3 connected to the member to be operated such as a brake shoe. The piston, in order to operate freely within the cylinder, has a clearance between it and the cylinder wall which is indicated at 4 in a slightly exaggerated condition. This clearance may vary considerably when the parts are new depending upon the type of material used in the piston and cylinder. If these materials have different coefficients of expansion, the clearance would be greater than if the members were made of the same material. Wear of the surfaces of the piston and the cylinder during operation of the piston also results in this clearance being increased. It also may be found necessary during the life of the motor to hone the cylinder in order to maintain its inner surface smooth and, therefore, this will also cause the clearance between the cylinder and piston to be increased.

In order that the packing cup 5, which is molded of rubber or other suitable material and associated with the head of the piston, will be prevented from being forced into the clearance 4 when the fluid in the chamber 6 of the cylinder is placed under a high pressure, I provide a split resilient ring 7 on the piston for "blocking off" the clearance from the cup. The peripheral portion of the piston adjacent the head end of the piston is cut away to form a reduced portion or projection 8 which is of a length equal to the axial thickness of ring 7 and of such diameter that the piston ring may be placed between it and the wall of the cylinder. Since ring 7 is split and of resilient construction, it will spring outwardly into engagement with the wall of the cylinder and maintain this engagement at all times notwithstanding increase in diameter of the cylinder caused either by wear or a honing operation. It is thus seen that this ring establishes a zero clearance between it and the cylinder wall throughout the circumference of the ring. As there is no clearance space between the ring and the cylinder, no portion of the packing cup 5 can be forced into clearance 4 by fluid under pressure acting on the packing cup 5.

There is, however, a clearance between the inner surface of the ring and the outer surface of the reduced portion 8 of the piston which will increase as the cylinder wall is worn. In order to prevent any portion of the rubber cup from being forced into this gap, I provide a thin metal plate 9 between the cup and the head of the piston. This plate is of a diameter substantially the same as the cylinder, being less by only a few thousandths of an inch. The plate is of such thinness as not to cause any cutting of the cup, notwithstanding the fact that the plate may have sharp edges or the cup can be forced down along side the edge of the plate. The edge of the plate, however, is preferably beveled as shown.

In order to insure that the plate also covers the space 10 between the ends of the resilient ring 7, the plate is fastened to the ring by a pin 11 at a point closely adjacent one end of the ring. The axis of the plate is so positioned relative to the axis of the piston that the edge of the plate adjacent the point where it is connected to the ring has substantially no clearance with respect to the cylinder wall. This will result in substantially all of the space between the ends of the ring being covered by the plate under all conditions. Thus if the ring should expand due to increase in diameter of the cylinder, this expansion is permitted by the plate but the plate will remain in such a position as to cover the increased space between the ends of the ring. In order that the plate and ring may be held on the piston there is provided a pin 12 which passes through an enlarged hole 13 in the plate. The head of the pin does not clamp the plate to the head, thus permitting the plate to slide on the piston head.

From the above described construction it is apparent that all portions of the cup are prevented from being forced into the clearance space 4 between the piston and the cylinder. The piston ring completely "blocks off" the packing cup from the clearance space and since this ring has zero clearance with respect to the cylinder wall, there is no opening into which the material of the cup can be forced. Also the thin metal plate is so associated with the ring that the gap between the ends of the ring is substantially totally covered by the plate at all times, as is also the gap between the inner surfaces of the piston ring and the piston. The entire construction is such that a surface is presented for engagement with the base of the packing cup which extends to all points of the cylinder wall, thus not leaving any opening into which the cup can be forced by fluid under pressure acting on the cup. Since plate 9 is of such thinness that it will not cause any cutting of the cup even though the cup should be forced around the edge of the plate, there is no possibility of the cup being damaged as a result of the cup being forced into the small shallow crescent-shaped space at the edge of the plate opposite the point where it is secured to the ring. Also because of the thinness of the plate and its inability to cut the cup, it is apparent that the central portion of this plate may be eliminated if desired.

In Figure 3 I have shown a slightly modified construction. The piston 14 is reciprocable in a cylinder 15 with the usual clearance and the forward end of the piston has associated therewith a split resilient piston ring 16 of L-shaped cross section. The head of the piston is so formed as to receive the piston ring so the forward surface of the ring is flush with the surface of the head of the piston. The cylinder contacting portion of the ring lies in an annular recess in the piston. Since the piston ring is expansible, it maintains constant contact with the inner surface of the cylinder to thus "block off" the clearance space between the piston and the cylinder wall. In order to present a surface having no crevices for engagement with the base of the packing cup 17, there is provided a thin plate 18 having a diameter substantially the same as the cylinder, being less only by a few thousandths of an inch. In order to insure that the plate is held in a position to cover the gap between the ends of the split piston ring at all times, a metal tab 19 is welded to the plate and has a portion 20 projecting through a slot in the plate and an opening 21 in the piston ring. The portion 20 is somewhat resilient and is adapted to cooperate with a hole 22 in the piston. The opening 21 in the piston ring is closely adjacent one end of the piston ring. It is thus seen that the resilient end portion of the metal tab tends to hold the plate in a position where it will engage the cylinder wall at a point midway between the ends of the piston ring and at all times cover the space between the ends of the piston ring. The plate is carried on the piston by a pin 23 which passes through an enlarged opening 24 in the plate. This pin, however, does not prevent lateral movement of the plate relative to the piston.

Sometimes the piston is of such small diameter that it is not practical to employ the construction shown in Figures 1 and 3 to prevent the packing cup from being forced into the clearance space between the piston and the cylinder. In Figure 4 I have shown a construction which is especially adapted for small pistons. In this construction the piston 25 carries a split resilient piston ring 26 at its forward end for "blocking off" the clearance space between the piston and the cylinder 27. A thin annular plate 28 is associated with the head of the piston, the piston ring and the packing cup 29 for preventing the packing cup from being forced into the gap between the piston ring and the piston. In order that the plate may be held in position, the rear end of the packing cup 29 is formed with a button 30 which cooperates with a recess 31 in the piston, this recess having an annular flange 32 at its open end to hold the button portion of the cup in position once it is forced into the recess. In order to facilitate the assembly of the packing cup and piston, there is provided a bleed passage 33 through the piston to permit any air which is trapped in the recess to escape during the assembling operation. The open end of the passage in the recess is covered by a disc in order that the piston will not be forced into the passage when the cup is subjected to fluid under pressure.

Being aware of the possibility of other modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In fluid pressure apparatus of the class described, a cylinder, a piston therein having a clearance with respect to the cylinder wall, a flexible packing cup associated with the piston and the cylinder wall, means for preventing the packing cup from being forced by fluid pressure into the clearance space, said means comprising a resilient split ring carried by the end of the piston and constantly engaging the wall of the cylinder, and a thin member overlying the gap between the inner surface of the ring and the adjacent surface of the piston.

2. In fluid pressure apparatus of the class described, a cylinder, a piston therein having a clearance with respect to the cylinder wall, a flexible packing cup associated with the piston and the cylinder wall, means for preventing the packing cup from being forced by fluid pressure into the clearance space, said means comprising a resilient split ring carried by the end of the piston and constantly engaging the wall of the cylinder, a thin member overlying the gap between the inner surface of the ring and the adjacent surface of the piston, and means for attaching the thin member to the ring at a point closely adjacent one end thereof.

3. In fluid pressure apparatus of the class described, a cylinder, a piston therein having a clearance with respect to the cylinder wall, said piston being provided with a reduced portion at its head end, a resilient split ring positioned on said reduced portion and having its outer peripheral surface constantly engaging the cylinder wall, said ring having an axial thickness equal to the length of the reduced portion, a thin member overlying the gap between the ring and reduced portion of the piston, and a flexible packing cup associated with the piston and having its base portion adjacent the thin member.

4. In fluid pressure apparatus of the class described, a cylinder, a piston reciprocable therein and having a clearance with respect to the cylinder wall, said piston being provided with a reduced portion at its head end, a resilient split ring positioned on said reduced portion and having its outer peripheral surface constantly engaging the cylinder wall, said ring having an axial thickness equal to the length of the reduced portion, a thin member for covering the gap between the ring and reduced portion of the piston, means for securing the thin member to the ring at a point closely adjacent one end thereof, the edge of said member at the side adjacent the ends of the ring being in close proximity to the cylinder wall, and a flexible packing cup associated with the piston and having its base portion adjacent the thin member.

5. In apparatus of the class described, a piston construction for association with a cylinder and adapted to have cooperating therewith a flexible packing cup, said piston construction comprising a piston, a split resilient ring for cooperation with the cylinder wall and associated with the head of the piston and having its forward surface flush with the adjacent forward surface of the piston head, and a thin member associated with the piston head and overlying the gap between the piston and ring.

6. In apparatus of the class described, a piston construction for association with a cylinder and adapted to have cooperating therewith a flexible packing cup, said piston construction comprising a piston, a split resilient ring for cooperation with the cylinder wall and associated with the head of the piston and having its forward surface flush with the adjacent forward surface of the piston head, a thin member associated with the piston head and overlying the gap between the piston and ring, and means for holding the thin member in a position where it will cover the gap between the ends of the split ring.

7. In apparatus of the class described, a piston construction for reciprocation within a cylinder and adapted to have associated therewith a flexible packing cup, said piston construction comprising a piston, a split resilient ring for cooperation with the cylinder wall and associated with the head of the piston and having its forward surface flush with the adjacent forward surface of the piston head, a plate carried by the piston head, and means for so attaching the plate to the split ring at a point adjacent one end thereof that said plate will at all times cover any gap between the ends of the ring.

8. In apparatus of the class described, a piston construction for reciprocation within a cylinder and adapted to have associated therewith a flexible packing cup, said piston construction comprising a piston, a split resilient ring for cooperation with the cylinder wall and associated with the head of the piston, said ring being of L-shaped cross section with its forward surface flush with the head surface of the piston, a thin plate overlying the gap between the ring and the piston, and a tab carried by the plate and cooperating with the ring for holding the plate in a position where it will at all times cover the gap between the ends of the split ring.

9. In apparatus of the class described, a piston and piston packing construction for mounting in a cylinder, said construction comprising a piston provided with a recessed head, a resilient split ring associated with the periphery of the head of the piston and having its outer edge surface flush with the adjacent forward head surface of the piston, an annular thin plate overlying the gap between the ring and the piston, and a packing cup provided with means on its base for cooperation with the recess in the head of the piston to thereby connect the cup to the piston and maintain the annular plate in position.

10. In apparatus of the class described, a piston and piston packing construction for mounting in a cylinder, said construction comprising a piston provided with a reduced head portion and also with a recess in its head having a restricted opening, a resilient split ring mounted on the reduced head portion of the piston and having its outer edge surface flush with the adjacent forward head surface of the piston, an annular thin plate overlying the gap between the ring and the piston, and a packing cup formed with a button on its base for cooperation with the recess in the head of the piston to thereby connect the cup to the piston and maintain the annular plate in position.

11. In apparatus of the class described, a piston construction for association with a cylinder and adapted to have cooperating therewith a flexible packing cup, said piston construction comprising a piston, a split resilient ring for cooperation with the cylinder wall and associated with the head of the piston and having its forward surface flush with the adjacent forward surface of the piston head, a thin member associated with the piston head and overlying the gap between the piston and ring, and means for so biasing the thin member with respect to the piston that it will contact the cylinder wall when the piston is placed in the cylinder and cover the gap between the ends of the ring.

12. In apparatus of the class described, a piston construction for association with a cylinder and adapted to have cooperating therewith a flexible packing cup, said piston construction comprising a piston, a split resilient ring for cooperation with the cylinder wall and associated with the head of the piston and having its forward surface flush with the adjacent forward surface of the piston head, a thin member associated with the piston head and overlying the gap between the piston and ring, and means for so biasing the thin member with respect to the piston that it will contact the cylinder wall when the piston is mounted in the cylinder, said means also maintaining such a relationship between said point of contact and the gap between the ends of the ring that the thin member will at all times cover said gap.

13. In a fluid pressure apparatus of the class described, a cylinder, a piston therein having a clearance with respect to the cylinder wall and presenting a face toward the fluid in the cylinder which is to be placed under pressure, a flexible packing cup of rubber or like material associated with the piston face and being directly acted upon by fluid pressure in the cylinder and capable of being forced into said clearance, and means comprising a member resilient in a radial direction and so associated with the piston, the cylinder wall and a rear portion of the packing cup adjacent the piston face as to present such a surface that the material of the packing cup will be prevented from being forced by fluid pressure acting thereon into the clearance space and cut or damaged during piston movement.

14. In fluid pressure apparatus of the class described, a cylinder, a piston therein having a clearance with respect to the cylinder wall and presenting a flat surface toward the fluid in the cylinder which is to be placed under pressure, a flexible packing cup of rubber or like material associated with the flat surface and directly acted upon by fluid pressure in the cylinder whereby it may be forced into said clearance, and means for preventing the material of the cup from being forced into the clearance and cut or damaged during movement of the piston, said means comprising an annular peripheral recess in the forward end of the piston and a resilient split ring in said recess presenting a surface flush with the flat surface of the piston and constantly engaging the wall of the cylinder.

BURNS DICK.